June 12, 1923.

J. L. MILLER

HITCH

Filed Nov. 5, 1921

J. L. Miller
INVENTOR

BY Victor J. Evans
ATTORNEY

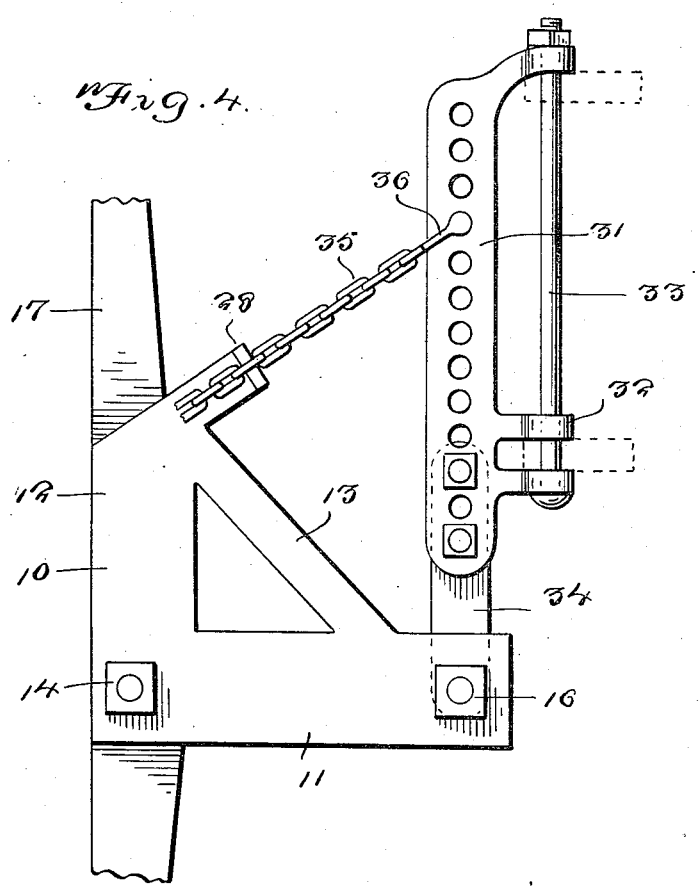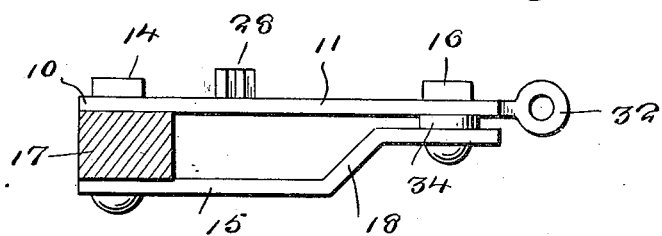

Patented June 12, 1923.

1,458,838

UNITED STATES PATENT OFFICE.

JOHN L. MILLER, OF RANDALL, KANSAS.

HITCH.

Application filed November 5, 1921. Serial No. 513,109.

*To all whom it may concern:*

Be it known that I, JOHN L. MILLER, a citizen of the United States, residing at Randall, in the county of Jewell and State of Kansas, have invented new and useful Improvements in Hitches, of which the following is a specification.

This invention relates to draft equalizers or hitches especially designed for plows and has for an object the provision of a hitch which may be used in connection with either a frame or beam plow.

Another object of the invention is the provision of a hitch which is so constructed as to permit the draft animals to walk free and directly ahead, without pulling the plow to one side, and thus eliminate side draft and reduce the power necessary for pulling the plow.

Another object of the invention is the provision of a hitch of this character, which is exceedingly simple in construction and which may be applied to the various types of plows now in use.

With the above and other objects in view, the invention further includes the following novel features and details of construction, to be hereinafter more fully described, illustrated in the accompanying drawings and pointed out in the appended claims.

In the drawings:—

Figure 4 is a view similar to Figure 1 showing the hitch applied to a beam plow.

Figure 5 is a side elevation of the same.

Figure 1:
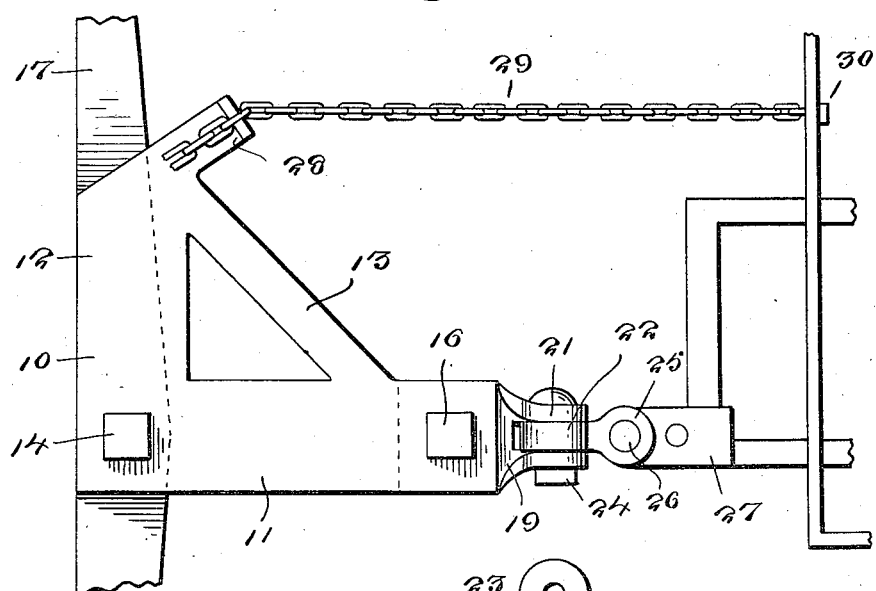
Figure 1 is a plan view showing the hitch applied to the forward end of a frame plow.

Referring to the drawings in detail, wherein like characters of reference denote corresponding parts, the device is shown as including a hitching plate indicated at 10. This plate may be of various designs, the one shown being substantially L-shaped and including a longitudinal arm 11 and a transverse arm 12, both of which lie in a horizontal plane, the said arms being preferably connected by means of an inclined brace 13.

The draft animals or other propelling means are designed to be secured to the forward end of the hitching plate at the juncture of the arms 11 and 12 and for this purpose, the said plate is provided with an opening for the passage of a bolt or pin 14 which extends downwardly and engages a brace 15 which is secured to the hitching plate near the rear end thereof by means of a bolt 16. The bolt 14 serves as a means for connecting the hitching plate to a double tree 17 or other draft gear, the latter being connected by the bolt between the plate 10 and the brace 15 which is provided with an offset 18 so as to space the forward end of the brace from the plate.

Figure 2:
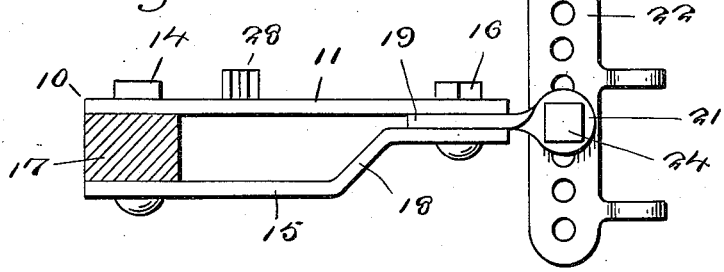
Figure 2 is a side elevation of the same.
Figure 3:
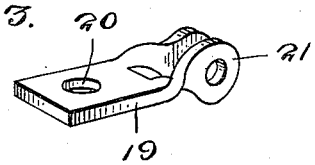
Figure 3 is a detail perspective view of the coupling member.

The hitching plate is designed to be secured to either a frame plow or a beam plow, the means for securing the plate to a frame plow being illustrated in Figures 1, 2 and 3 of the drawings. For this purpose there is provided a coupling member 19 which is in the form of a plate having an opening 20 for the passage of the bolt 16 and being provided with spaced apertured ears 21 which are disposed at right angles to the plate. The ears 21 are thus vertically positioned and are adapted to receive between them a vertically disposed clevis 22. This clevis comprises a plate having spaced perforations 23 for engagement with the bolt 24, the latter passing through the apetures in the ears 21 so as to regulate the height of the hitching plate. The clevis is further provided with spaced apertured ears 25 for the passage of a bolt or pin 26 for connection with the frame 27 of the plow.

Located at the outer end of the horizontal arm 12 is a hook 28, which is preferably bifurcated as shown and is adapted for adjustable connection with the chain 29 or other flexible element, the inner end of which is secured to the front furrow wheel bracket as shown at 30 or to any other convenient, relatively stationary part of the plow. This permits of the attachment of the hitch to frames of various widths and at the same time permits the hitching plate to be positioned to the extreme left of the frame, which allows the draft animals to walk directly ahead, the chain 29 being so adjusted as to provide a direct forward pull irrespective of the position of the draft animals.

In Figures 4 and 5 the invention is shown as applied to a beam plow in which the clevis 31 is horizontally arranged. This clevis like the clevis 22 is provided along one edge with spaced ears 32 for the reception of a bolt or pin 33, by means of which it is connected to a beam of the plow. In this form of the invention the coupling member 19 is dispensed with and the bolt 16 is connected directly to the extreme left hand end of the clevis 31, an extension 34 being provided for this purpose. The chain 35, in this form of the invention is secured to a bolt 36 which extends through one of a plurality of spaced openings 37 formed in the clevis. By this means the chain may be adjustably connected with the clevis to provide for a proper regulation of the draft, the opposite end of the chain being adjustably engaged with the hook 28 of the attaching plate.

The invention is susceptible of various changes in its form, proportions and minor details of construction and the right is hereby reserved to make such changes as properly fall within the scope of the appended claims.

Having described the invention what is claimed is:—

1. A draft equalizer comprising a hitching plate including right angularly disposed relatively rigid arms, means located at the juncture of the arms for pivotal connection with a draft gear, horizontally and vertically pivoted attaching means secured to one of the arms and a flexible member having one end adjustably secured to the outer end of the other arm.

2. A draft equalizer comprising a hitching plate including right angularly disposed relatively rigid arms, means located at the juncture of the arms for pivotal connection with a draft gear, a coupling link having one end pivotally secured to the end of one of the arms, spaced eyes located at the opposite end of the link, said eyes being disposed at an angle of 90 degrees with respect to the pivotal connection with the arm of the plate, whereby the said plate may be permitted horizontal and vertical pivotal movement and a flexible element having one end adjustably secured to the outer end of the other arm.

In testimony whereof I affix my signature.

JOHN L. MILLER.